United States Patent [19]

Bardhan et al.

[11] Patent Number: 4,719,187

[45] Date of Patent: Jan. 12, 1988

[54] DENSE SINTERED BODIES OF NITRIDE MATERIALS

[75] Inventors: Pronob Bardhan, Corning; Gregory A. Merkel, Painted Post, both of N.Y.

[73] Assignee: Corning Glass Works, Corning, N.Y.

[21] Appl. No.: 937,209

[22] Filed: Dec. 3, 1986

Related U.S. Application Data

[63] Continuation-in-part of Ser. No. 785,953, Oct. 10, 1985, abandoned.

[51] Int. Cl.$^4$ .................. C04B 35/58; C04B 35/50
[52] U.S. Cl. ........................................ 501/97; 501/96; 501/98; 501/151
[58] Field of Search ............... 501/97, 96, 98, 151

[56] References Cited

U.S. PATENT DOCUMENTS

| | | | |
|---|---|---|---|
| 2,618,565 | 11/1952 | Nicholson | 501/96 |
| 3,108,887 | 10/1963 | Lenie et al. | 501/98 |
| 3,238,018 | 3/1966 | Winter et al. | 501/98 |
| 4,119,475 | 10/1978 | Prochazka et al. | 501/97 |
| 4,122,140 | 10/1978 | Greskovich et al. | 501/97 |
| 4,146,379 | 3/1979 | Copley et al. | 501/88 |
| 4,435,513 | 3/1984 | Komeya et al. | 501/96 |
| 4,540,673 | 9/1985 | Takeda et al. | 501/96 |
| 4,591,537 | 5/1986 | Aldinger et al. | 501/96 |
| 4,636,480 | 1/1987 | Hillig | 501/87 |

FOREIGN PATENT DOCUMENTS

| | | | |
|---|---|---|---|
| 147101 | 7/1985 | European Pat. Off. | 501/98 |
| 0166073 | 1/1986 | European Pat. Off. | 501/96 |
| 58-55375 | 4/1983 | Japan | 501/96 |
| 59-50077 | 3/1984 | Japan | 501/96 |
| 60-195058 | 10/1985 | Japan | 501/96 |
| 949471 | 2/1964 | United Kingdom | 501/96 |
| 978734 | 12/1964 | United Kingdom | |
| 2129788 | 5/1984 | United Kingdom | 501/97 |
| 571497 | 9/1977 | U.S.S.R. | 501/97 |

OTHER PUBLICATIONS

Gauthier, G. et al., "Influence of Very Low Additions of CaO and $Y_2O_3$ on the Densification of Aluminum Nitride by Hot-Pressing between 1650° C. and 1750° C.", C.R. Acad. Sc., Paris, t301, Serie II, No. 3, 1985, pp. 135–138 & Translation of 7 pages.

Komeya, K. et al., "Effects of Various Additives on Sintering of Aluminum Nitride", J. of Cer. Soc. of Japan, 89(6), Jun. 1, 1981, pp. 330–336, 18 page Eng. Translation.

Advanced Optical Ceramics, Phase III, Final Report, DIN:82, SDR 20006, Feb. 1982, pp. 4–76 to 4–80, pp. 4–127 to 4–1437.

Primary Examiner—Mark L. Bell
Attorney, Agent, or Firm—C. S. Janes, Jr.

[57] ABSTRACT

This invention is directed to the production of nitride-based ceramic bodies selected from the group of AlN and $Si_3N_4$ which can be sintered to near theoretical densities at temperatures at least 200° C. lower than those required for the pure materials. Such bodies are densified through the addition of a metal fluoride selected from the group of aluminum, barium, calcium, srtrontium, yttrium, the lanthanide rare earth metals, and mixtures thereof. Up to 80% by weight of said metal fluoride may be included but, generally, such additions will be held between 5–30% by weight. AlN bodies exhibiting very high thermal conductivity can be prepared by sintering with a metal fluoride selected from the group of barium, calcium, strontium, yttrium, the lanthanide rare earth metals, and mixtures thereof.

10 Claims, No Drawings

DENSE SINTERED BODIES OF NITRIDE MATERIALS

This is a continuation-in-part application of Ser. No. 785,953, filed Oct. 10, 1985, abandoned.

BACKGROUND OF THE INVENTION

Pure nitride materials such as, for example, AlN and $Si_3N_4$, are very difficult to sinter into bodies of near theoretical density from high purity powders because of the extremely low self-diffusion rates in those strongly covalently-bonded materials. Thus, temperatures of 1800° C. and higher have been required to achieve bodies of nearly full density.

This invention is directed to means for producing highly refractory, sintered bodies of nitride materials exhibiting nearly theoretical density and excellent mechanical strength wherein the temperatures needed for sintering can be relatively low. Most particularly, this invention is concerned with means for preparing sintered bodies of AlN demonstrating nearly full density and exceptional thermal conductivity.

Aluminum nitride (AlN) has recently gained considerable attention for its proposed application as a substrate or heat sink in integrated circuit packages due to its potentially high thermal conductivity together with a high electrical resistivity (at least $10^{11}$ ohm cm up to in excess of $10^{15}$ ohm cm), a dielectric constant of about 9–10, and a coefficient of thermal expansion close to that of silicon. Although AlN has been predicted to have a thermal conductivity of 320 W/m.K, most polycrystalline AlN ceramic bodies known in the literature have manifested a thermal conductivity over the interval of about 35–70 W/m.K.

The primary objective of the instant invention is to produce highly refractory, sintered bodies of nitride materials of near theoretical density by firing at temperatures as low as 1400° C. with or without externally applied pressure. A more specific second objective of the invention is to prepare highly refractory, sintered AlN-based ceramic bodies of nearly full density and much enhanced thermal conductivity relative to AlN bodies produced in the conventional manner.

SUMMARY OF THE INVENTION

We have discovered means by which bodies of nitride materials can be sintered to near theoretical density and exhibiting very high mechanical strength at temperatures at least 200° C. below those required for sintering high purity powders. For example, highly refractory AlN and $Si_3N_4$ bodies of near full density can be fabricated at temperatures as low as 1400° C. Furthermore, AlN bodies sintered in accordance with our invention manifest thermal conductivities greater than twice those exhibited by AlN bodies fired in accordance with the techniques described in the prior literature. As defined herein, near theoretical density comprehends a density of at least 90% of that theoretically possible based upon the composition of the body.

Our invention comprises the use as a sintering aid of a fluoride selected from the group of aluminum, barium, calcium, strontium, yttrium, a lanthanide rare earth metal, and mixtures thereof. Whereas the addition of as little as 1% by weight of the metal fluoride to the AlN and $Si_3N_4$ will positively impact upon the sinterability of the nitride body, a minimum addition of about 5% by weight will commonly be employed to insure a truly substantial effect in reducing the temperature required for sintering. At the other extreme, up to 80% by weight of the sintering aid may be included but, as can be readily appreciated, the properties of the final product will then more closely approximate those of the metal of the fluoride, rather than the cation of the nitride material. Consequently, the metal fluoride addition will normally be held below 30% by weight and preferably no more than 15%. As can be appreciated, the proportions of the components remaining in the final sintered body are dependent upon the time and temperature employed in the sintering operation. For example, higher firing temperatures lead to more rapid loss of readily-volatilizable materials such as fluorine, and longer exposures to elevated temperatures result in greater losses of volatile ingredients. In the present compositions, the amount of metal selected from the group consisting of aluminum, barium, calcium, strontium, yttrium, a lanthanide rare earth metal, and mixtures thereof analyzed in the sintered bodies will generally range about 0.02–25% by weight, and the fluorine content, as analyzed, will generally range about 0.005–10% by weight. (Where $AlF_3$ is employed as the sintering aid with AlN, the aluminum analyzed is that in excess of the AlN material.). Hence, the sintered body may contain essentially all of the metal fluoride added to the AlN and/or $Si_3N_4$ or, because of the degree of volatilization and/or exudation of fluorine-containing species, depending upon such variables as the identity of the metal fluoride added, the firing atmosphere, and the time and temperature of sintering, may contain very minuscule amounts.

Scanning electron microscopy of fracture surfaces of the inventive products has commonly indicated the presence of a semi-continuous grain-boundary phase between the crystals of the nitride materials. These microstructural features, together with the fact that the temperatures utilized in the sintering reaction are higher than the melting points of the metal fluoride sintering aids, lead to the hypothesis that the metal fluorides promote densification of the nitride materials through a liquid phase sintering mechanism. Irrespective of the mechanism involved, the present invention permits the sintering to nearly full density of bodies consisting essentially of about 0.02–25% by weight of at least one metal selected from the group consisting of aluminum, barium, calcium, strontium, yttrium, and a lanthanide rare earth metal, about 0.005–10% by weight of fluorine, and the remainder at least one nitride selected from the group of aluminum nitride and silicon nitride. Temperatures between about 1400°–2000° C. are operable for sintering AlN and temperatures between about 1400°–1800° C. may be utilized for sintering $Si_3N_4$. In general, the lesser the amount of metal fluoride added, the higher the temperature required for sintering. Furthermore, fluorine volatilization is more rapid at higher temperatures, thereby enhancing the hazard of environmental pollution. It will be appreciated, however, that a reduced fluorine content in the sintered body may be advantageous with respect to the properties exhibited thereby.

The inventive compositions provide bodies of very high refractoriness, coupled with excellent electrical properties, the latter feature rendering them particularly suitable for use as substrates in integrated circuit packages.

In carrying out the method of the invention, the metal fluoride additives, or precursor materials which may be converted into the desired metal fluoride, may be introduced into the nitride-based materials through any of the admixing techniques known in the ceramic art including, but not limited to:

(1) addition in the form of a powder or liquid to the nitride-containing starting powders prior to any compaction or densification;

(2) infiltration of an unsintered or partially sintered porous body with a solution or suspension (preferably non-aqueous) of the additive or precursor;

(3) infiltration of an unsintered or partially sintered porous body through vapor phase transport of the additive or other precursor; and (4) the additive may constitute an intrinsic component in the nitride-based material, having been present in some form in the original precursor material from which the nitride was prepared.

Whereas reaction between the nitride-based material and the metal fluoride (or precursor thereof) to densify the final product may be carried out through various procedures known to the ceramic art, the preferred method comprises either uniaxial hot pressing or pressureless sintering; both processes being conducted in an inert environment, desirably either in a vacuum or in an atmosphere comprised predominantly of nitrogen.

Workers in the field have attributed the failure of the currently-available AlN bodies to exhibit the level of thermal conductivity theoretically possible to the presence of $Al_2O_3$ impurity dissolved in the AlN phase. Hence, although metals conduct heat primarily by electrons, non-metallic elements or compounds, such as AlN, transport thermal energy by quanta of vibrational energy, referred to in the literature as acoustic phonons. Imperfections in the crystal structure such as, for example, interstitial atoms and dislocations, lattice vacancies, and substituted impurities, increases phonon scattering and thereby decrease the thermal conductivity of the non-metallic compound below its theoretically achievable value. Because the metal:non-metal ratio in $Al_2O_3$ is less than that in AlN, dissolution of $Al_2O_3$ in AlN produces one metal site vacancy for every three non-metal site substitutions, and the cumulative effect of these lattice vacancies and substituted oxygen impurities is to drastically lower the thermal conductivity of the AlN. The maximum solubility of $Al_2O_3$ in AlN has been estimated to be ~2.1% by weight or ~1% by weight oxygen. That presence of $Al_2O_3$ is sufficient to drive the thermal conductivity from the theoretical value of 320 W/m.K for pure AlN to ~70 W/m.K.

AlN powder commonly contains ~1-3% by weight oxygen, most of which is present as a thin film of amorphous $Al_2O_3$ on the surface of the AlN particles. That surface layer forms through the reaction of AlN with moisture in the air and the formation thereof is difficult, if not impossible, to avoid. Densification of compacted powders of AlN results in the diffusion of $Al_2O_3$ into AlN until the saturation limit of ~2.1% $Al_2O_3$ is reached. Any excess $Al_2O_3$ beyond ~2.1% leads to the development of one or more secondary phases; e.g., $\alpha$-$Al_2O_3$ below ~1700° C., $\gamma$-ALON spinel ("$Al_{23}O_{27}N_5$" solid solution) between ~1700°-1850° C., or "27R" Al-O-N pseudopolytype ($Al_9O_3N_7$) above ~1850° C. Hence, sintering of typical AlN powders produces an AlN-based ceramic wherein the nitride phase is saturated, or very nearly so, with $Al_2O_3$ and which, therefore, has a markedly-reduced thermal conductivity, viz., ~70 W/m.K.

It is believed that the sintering aids underlying the present invention react with the $Al_2O_3$ component of the body at elevated temperatures to form one or more secondary crystalline or non-crystalline phases. Thus, it has been postulated that the essential function of those secondary phases is to "buffer" or constrain the chemical activity, or partial molal free energy, of $Al_2O_3$ in the body at a lower value than where the densification additives are absent. A reduced $Al_2O_3$ activity would result in a decreased solubility of $Al_2O_3$ in the AlN phase which, in turn, would cause an increase in the thermal conductivity of the AlN. Moreover, because the level of $Al_2O_3$ in the AlN phase is fixed at a maximum value of about 2.1%, if a separate aluminum oxide or aluminum oxynitride phase is present in the ceramic body, it is conjectured that the concentration of additive must be sufficiently high such that, after reaction and densification, no discrete $Al_2O_3$ or Al-O-N phase can be detected within the limits of the analytical technique. This hypothesis is supported in the working examples set out below wherein secondary oxide, oxynitride, or oxyfluoride phases were formed and in which only those samples lacking the presence of an $\alpha$-$Al_2O_3$ or $\gamma$-ALON spinel phase exhibited enhanced thermal conductivities.

Based upon the prior literature and reasoning empirically from the working examples presented infra, the following model has been deduced. Thus, the metal fluoride additives are believed to react with the $Al_2O_3$ component of the system to form $AlF_3$ vapor plus one or more metal aluminates, metal oxides, metal oxyfluorides, or metal oxynitrides, where some or all of the reactants may be present in a liquid phase at the temperature of reaction or sintering.

Thermodynamic data for alkaline earth metal and rare earth metal fluorides would indicate that the proposed reaction would be inoperative, assuming a partial pressure of $AlF_3$ vapor equal to one atmosphere. Nevertheless, in several of the working examples reported infra, the metal fluorides did in fact react to form secondary phases in pressurelessly sintered specimens. Those apparent anomalies can be reconciled with the thermodynamic data when it is assumed that the partial pressure of $AlF_3$ during reaction was substantially less than one atmosphere. Such an assumption is very reasonable for open system-type environments from which $AlF_3$ can readily escape. Under those circumstances the postulated reaction mechanism becomes feasible for the calcium, strontium, barium, and rare earth metal fluoride additives.

The preferred quantity of metal fluoride to be introduced is dependent upon the amount of $Al_2O_3$ present with which the metal fluoride must react and upon the composition(s) of the secondary phase(s) desired to be formed. The minimum concentration of additive necessary to be effective in decreasing the solubility of $Al_2O_3$ in the coexisting AlN is that amount required to react with the $Al_2O_3$ component to such an extent that no separate $Al_2O_3$ or Al-O-N phase will be detected after reaction and densification.

Depending upon the number of phases included in the AlN+$Al_2O_3$ +additive system, increasing the molar ratio of metal fluoride with respect to $Al_2O_3$ results in a succession of secondary phase assemblages which define progressively lower $Al_2O_3$ activities in the system, and thereby reduced $Al_2O_3$ solubilities and enhanced thermal conductivities in the coexisting AlN phase. Eventually, however, increasing the level of metal fluoride beyond some limiting quantity will produce no further reaction. Such quantity thus defines the maximum amount of additive which is beneficial in decreasing the activity of $Al_2O_3$ in the system.

It can be appreciated that, as greater amounts of metal fluoride are added to reduce the activity of $Al_2O_3$, the volume fraction of secondary phases formed during the reaction progressively increases. Because these secondary phases normally have levels of thermal conductivity much less than that of AlN, their presence exerts a deleterious effect upon the overall thermal conductivity of the final product. Consequently, it is much preferred that the $Al_2O_3$ content of the AlN starting material be at the lowest possible level, thereby minimizing the quantity of metal fluoride required to form a given secondary phase assemblage and, hence, minimizing the volume fraction of secondary phases produced.

Therefore, in summary, where a AlN product exhibiting the highest thermal conductivity is desired, i.e., greater than 70 W/m.k and, preferably, greater than 100 W/m.K, the concentration of metal fluoride added will be at least equal to that amount necessary to react essentially completely with the $Al_2O_3$ present. In terms of mole percent, an $Al_2O_3$ content of about 2 mole percent, equivalent to about 2% by weight oxygen, will require the presence of about 0.8-2 mole percent metal fluoride to react completely with and thereby essentially eliminate any detectable separate $Al_2O_3$ and/or Al-O-N phase(s). The level of fluoride added will be dependent upon the identity of the metal of the fluoride. The addition of greater amounts of metal fluoride up to a maximum of about 6 mole percent will further reduce the amount of $Al_2O_3$ dissolved in the AlN phase and, in so doing, will effect an increase in the thermal conductivity of the body. Beyond about 6 mole percent, however, the presence of fluoride does not impart any further benefit. A higher (or lower) initial oxygen content in the AlN will, of course, demand a higher (or lower) content of fluoride to achieve the same level of reaction. Moreover, where volatilization of metal fluoride during sintering is quite significant, the actual amount of metal fluoride to be added to achieve the desired extent of reaction will be such as to compensate for that loss. Inasmuch as the conversion of $Al_2O_3$ involves the reaction of fluoride on an ionic basis to form $AlF_3$, the actual weight percent of metal fluoride added is dependent upon the identity of the metal. Hence, to achieve the same extent of reaction, a greater weight level of a heavier metal fluoride, e.g., a lanthanide rare earth metal, will be required than with a lighter metal fluoride such as $CaF_2$. Accordingly, in terms of weight percent, an $Al_2O_3$ content in the AlN material of about 4% by weight (approximately equal to 2 mole %) will require an addition of at least 1.6-8.5% by weight metal fluoride to essentially eliminate any $Al_2O_3$ and/or Al-O-N phase(s), and the presence of no more than about 10-22% by weight metal fluoride to minimize the amount of $Al_2O_3$ dissolved in the AlN phase.

The most preferred compositions consist essentially of about 0.1-10% of said metal and 0.005-7% fluorine.

Prior Literature

Numerous efforts have been made to improve the poor sintering character of nitride bodies through the addition of sintering or densification aids. Examples of such efforts are recorded below.

U.S. Pat. No. 3,833,389 describes the preparation of sintered composite bodies exhibiting good thermal shock resistance composed of three constituents: AlN and/or $Si_3N_4$; at least one oxide selected from the group of $La_2O_3$, $Ce_2O_3$, $Sc_2O_3$, $Y_2O_3$, and $Y_3Al_5O_{12}$ in an amount up to 50% by weight; and at least one component selected from the group of SiC, BN, and C, in either powder or whisker form in an amount less than 50% by weight. No reference whatever is made to fluoride and there is not even a vague suggestion that the oxide additions have any effect upon the sinterability of the AlN and $Si_3N_4$ or upon the thermal conductivity of the AlN.

U.S. Pat. No. 3,821,005 discloses the addition of such ingredients as $AlPO_4$, $GaPO_4$, $AlAsO_4$, $GaAsO_4$, AlP, GaP, AlAs, and GaAs as sintering aids for $Si_3N_4$ bodies. Fluoride is nowhere mentioned.

U.S. Pat. No. 3,830,652 reports the inclusion of at least one of the group $Y_2O_3$, $YCl_3$, and $Y(NO_3)_3$ in $Si_3N_4$ bodies to yield densities approaching the theoretical. Fluoride is nowhere mentioned.

U.S. Pat. No. 3,969,125 records the densification of sintered $Si_3N_4$ bodies through the incorporation of at least one of $Ce_2O_3$, $La_2O_3$, $Sc_2O_3$, $Y_2O_3$. $Y(OH)_3$ and/or $Y_2(CO_3)_3$ may be substituted for $Y_2O_3$. Sintering temperatures of 1400°-1900° C. were utilized. Fluoride is nowhere mentioned.

U.S. Pat. No. 3,992,497 recites the use of MgO as a sintering aid for $Si_3N_4$. Sintering temperatures of 1500°-1750° C. are reported. Fluoride is nowhere mentioned.

U.S. Pat. No. 4,180,410 discloses the utility of incorporating $Y_2O_3+CeO_2$ in $Si_3N_4$ bodies to perform as a sintering aid. Firing temperatures of 1700°-1900° C. were utilized. Fluoride is nowhere mentioned.

U.S. Pat. No. 4,280,850 teaches the use of the following as densifying additives for sintered $Si_3N_4$ bodies: CrN, ZrN, $ZrO_2$, $Y_2O_3$, MgO, and an oxide of a lanthanide rare earth including La, Ce, Pr, Nd, Pm, Sm, Eu, Gd, Tb, Dy, Ho, Er, Tm, Yb, and Lu. Firing temperatures of about 1675°-1800° C. were cited. Fluoride is nowhere mentioned.

U.S. Pat. No. 4,376,652 reports the addition of at least one of Ti, $TiO_2$, and TiN to $Si_3N_4$ bodies to perform as a sintering aid. Secondary sintering aids included MgO, CrN, $Y_2O_3$, $ZrO_2$, $HfO_2$, $La_2O_3$, $CeO_2$, $SiO_2$, and $Al_2O_3$. Fluoride is nowhere mentioned.

U.S. Pat. No. 4,407,970 records the utility of the following materials as sintering aids for $Si_3N_4$: AlN, $Al_2O_3$, $B_2O_3$, BeO, CaO, CoO, $Cr_2O_3$, $HfO_2$, $Li_2O$, MgO, $MnO_2$, $MoO_3$, $Nb_2O_5$, NiO, $Ta_2O_5$, $TiO_2$, $V_2O_5$, $WO_3$, $Y_2O_3$, and $ZrO_2$. Firing temperatures of 1500°-1900° C. were employed. Fluoride is nowhere mentioned and there is no reference to improving the thermal conductivity of AlN.

U.S. Pat. No. 4,435,513 claims a sintered body of AlN composed of three components: 0.047-5.66 parts by weight of CaO, BaO, SrO, or mixtures thereof; more than 0 and up to 6.54 parts by weight of carbon; and the balance AlN, the sum of the three components being 100 parts by weight. Fluoride is nowhere referred to; the CaO, BaO, and SrO are noted solely as comprising sintering aids and as adversely affecting the thermal conductivity of the body when present in more than the claimed amount; and the carbon is emphasized as imparting the improvement in thermal conductivity to the sintered products (Example 1 and Comparative Example 1).

U.S. Pat. No. 4,519,966 relates to the fabrication of crucibles consisting of 95% by weight AlN and up to 5% by weight BN or at least one rare earth metal oxide. The inclusion of BN or rare earth metal oxide is averred to increase the hardness of the AlN three to fourfold. Fluoride is nowhere mentioned and there is no indication of the utility of rare earth oxides as sintering aids or in improving the thermal conductivity of AlN.

U.S. Pat. No. 4,540,673 describes the production of sintered bodies consisting principally of AlN exhibiting high density and thermal conductivity. The bodies also contain at least one other constituent selected from the group of beryllium, a beryllium compound, lithium, and a lithium compound. Nowhere is there any mention of $Si_3N_4$ or of $AlF_3$, $BaF_3$, $CaF_3$, $SrF_3$, $YF_3$, or rare earth metal fluorides. No reference is made to any reaction taking place between beryllium or lithium or their compounds with impurities in AlN, specifically $Al_2O_3$, to thereby essentially eliminate the presence of any separate $Al_2O_3$ and/or Al-O-N phase(s) in the fired body. Yet, the reaction of fluorine with oxygen to remove $Al_2O_3$ from the fired product comprises the crux of the present invention. Thus, the improvement in thermal conductivity experienced in the products of the patent is due to a different mechanism; quite likely simply the decrease in porosity in the sintered product.

Whereas $BeF_2$ and LiF are stated, along with many other beryllium and lithium compounds, as being operable, the only working examples reported in the patent supplying supporting data employed BeO or $Li_2CO_3$, the latter transforming to $Li_2O$ upon firing. Also, the patent permits the use of $Y_2O_3$, MgO, $Al_2O_3$, and $SiO_2$ as sintering agents. Those circumstances further underscore the fact that the mechanism underlying the present invention is different from that operating in the patent; the present invention is founded upon the production of essentially oxide-free AlN.

Furthermore, although the alkaline earth fluorides $CaF_2$, $SrF_2$, and $BaF_2$ perform in the instant invention to dramatically increase the thermal conductivity of sintered AlN bodies, laboratory experimentation has indicated that $MgF_2$ does not exert the same effect. This behavior of $MgF_2$ removes any assumption or theory that fluorides of all members of Group 2a of the Periodic Table would be operable in the present invention.

The fluxing effect of the alkali metal oxides with consequent reduction in refractoriness is well-known to the art. Hence, their presence is eschewed in articles proposed for use in applications demanding high refractoriness. Also, their deleterious effect upon the electrical properties of a body is likewise well recognized in the art. The compositions of the present inventive materials are essentially free of alkali metal oxides such as to render them especially suitable for use as substrates in integrated circuit packages.

U.S. Pat. No. 4,591,537 discloses the production of sintered bodies composed primarily of AlN which exhibit high density and thermal conductivity. The bodies also contained BN or at least one oxide of the group $Al_2O_3$, CaO, $Cr_2O_3$, MgO, $SiO_2$, $TiO_2$, $ZrO_2$, and a rare earth metal oxide. Fluoride is nowhere mentioned and the use of oxides as sintering agents is contrary to the mechanism of fluoride-for-oxygen substitution required in the present invention.

As is evident from the above brief reviews of the cited patents, research has been extensive and rather continuous up to the present to produce highly dense, mechanically strong, sintered nitride bodies through the use of a wide variety of sintering agents. Whereas the use of magnesium compounds for that purpose has been described, we have found that the heavier alkaline earth metals provide final products exhibiting a better matrix of physical properties. Nowhere in the above-reviewed patents is the operability of $CaF_2$, $SrF_2$, $BaF_2$, $YF_3$, or a lanthanide rare earth metal fluoride as a sintering agent disclosed. Moreover, any very importantly, although sintered bodies of AlN of essentially full density have been reported by prior workers, no allusion whatever has been made to the effectiveness of doping such bodies with barium, calcium, strontium, yttrium, and/or a lanthanide rare earth metal to markedly enhance the thermal conductivity thereof. In contrast, the sole reference to such doping (with $Y_2O_3$ in U.S. Pat. No. 4,435,513) warns that the practice can lead to a reduction in the thermal conductivity.

The mechanism underlying that phenomenon of low thermal conductivity has been conjectured to involve the formation of second phases of the AlN-sintering aid crystals at the grain boundaries and/or an increase of impurity levels in the crystal lattice of the AlN which give rise to extensive phonon scattering with resulting low levels of thermal conductivity. Hence, the results flowing from the present invention were unexpected and contrary to the disclosure of U.S. Pat. No. 4,435,513.

DESCRIPTION OF PREFERRED EMBODIMENTS

In each of the following working examples, the metal fluorides as powders were admixed with powders of the nitride material for about 12–48 hours in a vibratory ball mill employing alumina milling media and 1,1,1-trichloroethane as the liquid vehicle. The resultant slurry was subsequently dried in air at 60° C. to form a cake which was easily broken down to a fluffy powder by passing the material through a No. 30 United States Standard Sieve (595 microns). The AlN powder contained about 2% by weight oxygen (~4.2% by weight $Al_2O_3$).

Reaction and densification were carried out utilizing either uniaxial hot pressing or pressureless sintering in an inert atmosphere in accordance with the procedures set out below.

In the hot pressing process, about 30 grams of the metal fluoride-nitride mixture were deposited into a graphite mold having a graphite foil lining which had been spray coated with boron nitride. Hot pressing was performed in an induction heated furnace wherein the graphite mold and a surrounding graphite sleeve served as susceptors. The atmosphere in the furnace was either a vacuum or static nitrogen. The samples were initially placed under a load of about 2000 psi and heated at about 15° C./minute to about 500° C. Thereafter, the load was increased to about 5000 psi, the temperature raised at about the same rate to temperatures between about 1250°–1800° C., and maintained at that temperature for about 15–30 minutes. The pressure was then released slowly and the body cooled at a rate of about 25° C./minute.

In the pressureless sintering process, samples were prepared by uniaxially pressing about 2–4 grams of the metal fluoride-nitride mixture under a load of about 5–10 kpsi into a disc and then isostatically pressing the disc at ambient temperature environment at about 45 kpsi. The disc was thereafter rested atop a bed of packed boron nitride power in a carbon crucible. After covering, the crucible was introduced into an induction heated furnace coupled to a graphite sleeve susceptor. A static environment of nitrogen at one atmosphere pressure was employed or nitrogen was flowed into the furnace at a rate of about 20 SCFH and the temperature raised at a rate of about 30°–100° C./minute to a predetermined temperature. After a dwell period of about one hour, the furnace was cooled to about 200° C. in about three hours.

In each example the phase assemblages of the sintered bodies were identified through X-ray diffractometry and the thermal conductivities were derived from thermal diffusivities measured by the laser flash technique. Densities were determined utilizing the Westphal balance technique.

The following two examples illustrate conventional hot pressing and pressurelessly sintering of AlN powders, and report the microstructures and physical properties typically resulting from those operations.

EXAMPLE A

AlN powder having an initial $Al_2O_3$ content of about 4% by weight was hot pressed in the manner described above in a vacuum for about 30 minutes at 1770° C. to a final density of about 3.29 g/cm$^3$. X-ray diffraction analysis identified an $Al_{23}O_{27}N_5$ spinel-type crystal as the sole secondary phase. The thermal diffusivity of the body was measured at about 0.231 cm$^2$/second, corresponding to a thermal conductivity of about 56 W/m.K.

EXAMPLE B

AlN powder having an initial $Al_2O_3$ content of about 4% by weight was pressurelessly sintered in the manner described above in flowing nitrogen. After one hour at 1500° C., the body exhibited a density of 1.98 g/cm$^3$; after one hour at 1700° C., the body demonstrated a density of 2.22 g/cm$^3$; and after one hour at 1900° C., the body manifested a density of 3.09 g/cm$^3$. No secondary crystal phases were observed in x-ray diffractograms. The thermal diffusivity of the body sintered at 1900° C. was measured at about 0.199 cm$^2$/second, corresponding to a thermal conductivity of about 45 W/m.k.

The following examples illustrate the effectiveness of the present invention in producing sintered bodies of near theoretical density and, in the case of AlN, sintered bodies exhibiting exceptionally high thermal conductivity.

EXAMPLE I

A mixture of AlN with 10% by weight $YF_3$ was prepared and two 4 gram discs pressurelessly sintered in the manner described above in flowing nitrogen, one at a top temperature of 1500° C. and the other at a top temperature of 1900° C. The densities for the fired discs were 3.45 g/cm$^3$ and 3.16 g/cm$^3$, respectively. X-ray diffraction analysis indicated that the 1500° C. disc contained YOF and $Y_3Al_5O_{12}$ as secondary phases, whereas the interior of the 1900° C. specimen contained minor amounts of $Y_4Al_2O_9$ and YOF, with the surface containing minor secondary phases of $Y_2O_3$ and YN. No $\alpha$-$Al_2O_3$ or an Al-O-N phase was observed in either sample. The thermal diffusivities of the bodies were measured at 0.280 cm$^2$/second and 0.580 cm$^2$/second, respectively, equivalent to thermal conductivities of 69 W/m.k and ~132 W/m.k. The increase in thermal conductivity observed in the sample sintered at 1900° C. is consistent with the greater degree of reaction occurring between the $YF_3$ and $Al_2O_3$ implied by the x-ray diffractograms. Analysis of the 1500° C. sintered body showed an yttrium content of 6.19% by weight, an oxygen content of 2.02% by weight, and a fluorine content of 1.65% by weight. Analysis of the 1900° C. sintered body indicated that, due to volatilization of metal fluoride and oxide species during sintering at that temperature, the yttrium concentration had decreased to 2.6% by weight, the oxygen content decreased to 1.2% by weight, and the fluorine level decreased to 0.1% by weight.

EXAMPLE II

A mixture of AlN with 5% by weight $CaF_2$ was prepared as described above and 45 grams thereof were hot pressed for about 30 minutes at 5000 psi in a vacuum to a final density of about 3.26 g/cm$^3$, approximately 98% of the theoretical value. Densification took place between about 1250°–1550° C., over 200° C. less than the temperature required to densify AlN bodies without additives. X-ray diffraction analysis identified the presence of AlN with minor amounts of $CaF_2$ and $\alpha$-$Al_2O_3$, thereby suggesting little or no reaction between the fluoride and $Al_2O_3$ to produce secondary Ca-Al-O phases. The thermal diffusivity of the body was measured at 0.179 cm$^2$/second, corresponding to a thermal conductivity of only 43 W/m.K.

EXAMPLE III

A mixture of AlN with 5% by weight $CaF_2$ was prepared and two 4 gram discs were pressurelessly sintered in flowing nitrogen in the manner described above, one with a one hour hold at 1500° C. and the other with a one hour hold at 1900° C. The densities of the fired discs were measured at about 3.18 g/cm$^3$ and about 3.11 g/cm$^3$, respectively. The thermal diffusivities of the bodies were measured at 0.228 cm$^2$/second and 0.592 cm$^2$/second, respectively, equivalent to thermal conductivities of about 54 and 137 W/m.K, respectively. These values are consistent with a greater extent of reaction at 1900° C. Analysis of a third body of similar composition sintered at 1900° C. indicated that, because of volatilization of metal fluoride and oxide species during sintering at that temperature, the calcium content of the sample decreased from 2.6% by weight to 0.3% by weight, the oxygen content decreased from 4.4% by weight to 0.9% by weight and the fluorine level decreased from 2.0% by weight to 0.05% by weight. Analysis of the body sintered at 1500° C. found a calcium level of 2.34%, an oxygen content of 2.63%, and a fluorine concentration of 1.23%.

EXAMPLE IV

A mixture of AlN with 15% by weight $LaF_3$ pressed into 4 gram discs and pressurlessly sintered in the manner described above in flowing nitrogen for one hour at 1500° C. manifested a density of 3.39 g/cm$^3$, approximately 96% of theoretical density. The same composition sintered at 1900° C. for 30 minutes likewise exhibited a density of 3.39 g/cm$^3$. The thermal diffusivity thereof was measured at 0.421 cm$^2$/second, corresponding to a thermal conductivity of 124 W/m.K. Analysis of the 1500° C. sintered body indicated a La content of 10.6%, an oxygen content of 2.56%, and a fluorine level of 1.58%.

EXAMPLE V

A mixture of AlN+10% by weight $SrF_2$ pressed into two 4 gram discs and pressurelessly sintered in the manner described above in flowing nitrogen for one hour, one at 1500° C. and the other at 1900° C., respectively, exhibited a density of 3.09 g/cm$^3$ at 1500° C. and 3.15 g/cm$^3$ at 1900° C., respectively. X-ray diffractometry identified secondary phases as $SrF_2$ in the 1500° C. disc and $SrAl_2O_4$ and $SrF_2$ in the 1900° C. disc. The thermal diffusivity of the body sintered at 1500° C. was measured at 0.208 cm$^2$/second, corresponding to a thermal conductivity of about 46 W/m.k, whereas that of the body sintered at 1900° C. was measured at about 0.534 cm$^2$/second, equivalent to a thermal conductivity of about 121 W/m.K. The increase in thermal conductivity evidenced in the 1900° C. disc is consistent with the greater extent of reaction taking place between the $SrF_2$ and $Al_2O_3$ implied by the x-ray diffraction data. Analysis of the body sintered at 1900° C. indicated that, because of volatilization of metal fluoride and oxide species during sintering, the strontium level of the sample decreased from 6.5% by weight to 1.4% by weight, the oxygen concentration decreased from 3.0% to 1.1% by weight, and the amount of fluorine decreased from 2.7% to 0.2% by weight. Analysis of the 1500° C. sintered body showed a Sr concentration of 6.49%, an oxygen content of 2.57%, and a fluorine level of 2.09%.

EXAMPLE VI

A mixture of AlN+15% by weight $CeF_3$ pressed into two 4 gram discs and pressurelessly sintered in the manner described above in flowing nitrogen for one hour, one at 1500° C. and the other at 1900° C., respectively, demonstrated a density of 3.28 g/cm$^3$ at 1500° C. and 3.24 g/cm$^3$ at 1900° C., respectively. The thermal diffusivity of the disc sintered at 1900° C. was measured at about 0.539 cm$^2$/second, corresponding to a thermal conductivity of about 121 W/m.K. Analysis of the body sintered at 1900° C. demonstrated that, because of volatilization of metal fluoride and oxide species during sintering, the quantity of cerium decreased from 10.0% to 9.1% by weight, the oxygen content descreased from 2.5% to 1.6% by weight, and the concentration of fluorine decreased from 3.7% to 0.1% by weight. Analysis of the 1500° C. sintered body indicated essentially no loss of Ce, but a decrease in oxygen content to 2.32% and a decrease in fluorine content to 1.49%.

EXAMPLE VII

A mixture of AlN with 10% by weight $AlF_3$ was prepared as described above and 45 grams thereof were hot pressed for about 30 minutes at 5000 psi in a vacuum to a final density of about 3.21 g/cm$^3$. Densification occurred between about 1175°–1500° C., more than 250° C. lower than for AlN powder without additive.

EXAMPLE VIII

A mixture of $Si_3N_4$ and 10% by weight $BaF_2$ prepared as described above and 27 grams thereof were hot pressed for about 30 minutes at 5000 psi in an atmosphere of static nitrogen to a final density of about 3.25 g/cm$^3$, approximately 99% of the theoretical density. Densification took place over the temperature interval of about 1350°–1750° C.

EXAMPLE IX

A mixture of $Si_3N_4$ with 10% by weight $AlF_3$ was prepared in the manner set out above and 25 grams of the mixture hot pressed for about 30 minutes at 5000 psi in an atmosphere of static nitrogen. A density of about 3.12 g/cm$^3$, approximately 96% of the theoretical density, was measured on the sintered body. Densification occurred over the temperature range of about 1300°–1650° C.

EXAMPLE X

A mixture of AlN with 20% by weight $CaF_2$ pressed into a 4 gram disc and pressurelessly sintered in the manner described above for one hour in flowing nitrogen exhibited a density of 3.17 g/cm$^3$ at 1500° C., about 97% of theoretical density. Analysis of the disc found a Ca content of 9.94%, an oxygen level of 3.11%, and a fluorine concentration of 7.95%.

EXAMPLE XI

A mixture of AlN with 20% by weight $SrF_2$ pressed into a 4 gram disc and pressurelessly sintered in the manner described above for one hour in flowing nitrogen at 1500° C. demonstrated a density of 3.32 g/cm$^3$. Analysis of the disc showed a Sr level of 13.4%, an oxygen concentration of 2.54%, and a fluorine content of 5.38%.

EXAMPLE XII

A mixture of AlN with 20% by weight $YF_3$ pressed into a 4 gram disc and pressurelessly sintered in the manner described above at 1500° C. for one hour in flowing nitrogen exhibited a density of 3.38 g/cm$^3$. Analysis of the disc indicated a Y content of 11.2%, an oxygen concentration of 3.27%, and a fluorine content of 4.95%.

EXAMPLE XIII

A mixture of AlN and 30% by weight $LaF_3$ pressed into a 4 gram disc and pressurelessly sintered in the manner described above for one hour at 1500° C. in flowing nitrogen demonstrated a density of 3.53 g/cm$^3$. Analysis of the disc showed a La content of 21.2%, an oxygen level of 2.42%, and a fluorine level of 6.58%.

EXAMPLE XIV

A mixture of AlN and 30% by weight $CeF_3$ pressed into a 4 gram disc and pressurelessly sintered in the manner described above for one hour at 1500° C. in flowing nitrogen exhibited a density of 3.52 g/cm$^3$. Analysis of the disc showed a Ce level of 20.0%, an oxygen content of 2.10%, and a fluorine concentration of 6.24%.

The above examples clearly illustrate the effectiveness of additions of fluorides selected from the group of aluminum, barium, calcium, strontium, yttrium, and the lanthanide rare earth metals to nitride base materials to permit the production of sintered bodies of near theoretical density at temperatures substantially below those required for the individual nitrides. Thus, $Si_3N_4$ bodies can be sintered to near full density at temperatures well below 1700° C. Moreover, the examples also demonstrate that the thermal conductivity of AlN-based bodies can be significantly improved through the addition of like fluorides other than aluminum. Finally, whereas pressureless sintering to nearly full density can be accomplished at temperatures as low as about 1400° C. for AlN bodies when metal fluoride additives are employed with very low loss of the metal fluoride, sintering at higher temperatures can be beneficial in increasing the thermal conductivity of the final product.

EXAMPLE XV

A mixture of AlN with 17% by weight $Mg_3N_2$ and 3% by weight $MgF_2$ was prepared in the manner described above and 33 grams of that mixture were hot pressed for about 10 minutes at 5000 psi and 1400° C. in an atmosphere of static nitrogen to essentially full density of 3.28 g/cm$^3$. X-ray diffractometry indicated the presence of MgO as the sole secondary phase. The thermal conductivity of the sample was only 28 W/m.K, thereby demonstrating that the addition of $MgF_2$ did not enhance the thermal conductivity of the material.

EXAMPLE XVI

A mixture of AlN with 5% by weight $MgF_2$ was prepared and three 4 gram discs pressurelessly sintered in the manner discussed above in flowing nitrogen; one was fired at 1500° C., another at 1650° C., and the third at 1800° C. The densities of the fired articles were measured at 1.97 g/cm$^3$, 1.93 g/cm$^3$, and 1.94 g/cm$^3$, respectively, about 60% of the theoretical density. Thus, essentially no densification took place during firing of the bodies. Furthermore, X-ray diffractometry identified the presence of ALON spinel as a secondary phase in each sample, thereby indicating that the co-existing AlN is substantially saturated with oxygen. Such high porosity (low density) and saturation with oxygen will sharply reduce the thermal conductivity of the fired bodies.

The examples in the table below compare the relative effectiveness of the metal fluorides and metal oxides as sintering aids for AlN. In each instance batches of powdered AlN and the additive were prepared by vibratory milling for 96 hours in trichloroethane using alumina-/silica milling media. Compacted discs were fabricated by uniaxially pressing the powdered mixtures under a load of about 5 kpsi, followed by isostatic pressing at ambient temperature at 40 kpsi. The discs were then fired for one hour in flowing nitrogen at the temperatures reported in the table.

TABLE

| Additive (Wt. %) | Firing Temperatures | Density (g/cm$^3$) |
|---|---|---|
| 5% $CaF_2$ | 1500° C. | 3.30 |
| 5% CaO | 1500° C. | 2.72 |
| 10% $CaF_2$ | 1500° C. | 3.19 |
| 10% CaO | 1500° C. | 2.33 |
| 5% $SrF_2$ | 1700° C. | 3.20 |
| 5% SrO | 1700° C. | 2.56 |
| 10% $SrF_2$ | 1700° C. | 3.18 |
| 10% SrO | 1700° C. | 1.83 |
| 5% $YF_3$ | 1700° C. | 3.37 |
| 5% $Y_2O_3$ | 1700° C. | 2.43 |
| 10% $YF_3$ | 1500° C. | 3.32 |
| 10% $Y_2O_3$ | 1600° C. | 2.24 |
| 5% $LaF_3$ | 1700° C. | 3.33 |
| 5% $La_2O_3$ | 1700° C. | 2.70 |
| 10% $LaF_3$ | 1500° C. | 3.01 |
| 10% $La_2O_3$ | 1600° C. | 2.23 |
| 15% $LaF_3$ | 1700° C. | 3.25 |
| 15% $La_2O_3$ | 1700° C. | 2.81 |
| 10% $CeF_3$ | 1500° C. | 3.47 |

TABLE-continued

| Additive (Wt. %) | Firing Temperatures | Density (g/cm$^3$) |
|---|---|---|
| 10% $CeO_2$ | 1600° C. | 2.35 |
| 30% $CeF_3$ | 1500° C. | 3.52 |
| 30% $CeO_2$ | 1600° C. | 2.65 |

It is quite apparent that the metal fluorides are more effective in producing bodies of high density than are the metal oxides.

We claim:

1. A sintered nitride-based ceramic body of near theoretical density selected from the group consisting of AlN containing, as analyzed by weight, about 0.02–25% of a metal selected from the group consisting of Al, Ba, Ca, Sr, Y, a lanthanide rare earth metal, and mixtures of those metals, and about 0.005–10% fluorine, and $Si_3N_4$ containing, as analyzed by weight, about 0.02–25% of a metal selected from the group consisting of Al, Ba, Ca, Sr, Y, a lanthanide rare earth metal, and mixtures of those metals, and about 0.005–10% fluorine.

2. A ceramic body according to claim 1 wherein said metal is present in about 0.1–10% by weight and said fluorine is present in about 0.005–7% by weight.

3. A method for preparing an AlN-based ceramic body of near theoretical density comprising the steps of:
   (a) combining an AlN-based material with about 1–80% by weight of a metal fluoride selected from the group consisting of $AlF_3$, $BaF_3$, $CaF_2$, $SrF_2$, $YF_3$, a fluoride of a lanthanide rare earth metal, and mixtures of those metal fluorides; and
   (b) sintering that combination of AlN-based material and metal fluoride at a temperature between about 1400°–2000° C.

4. A method according to claim 3 wherein said metal fluoride is present in about 5–30% by weight.

5. A method according to claim 3 wherein said sintering temperature ranges between about 1400°–1900° C.

6. A sintered body of AlN-based material exhibiting near theoretical density and a thermal conductivity greater than 70 W/m.K consisting essentially of AlN and sufficient metal fluoride selected from the group consisting of $BaF_2$, $CaF_2$, $SrF_2$, $YF_3$, a fluoride of a lanthanide rare earth metal, and mixtures of those fluorides, to react essentially completely with the $Al_2O_3$ content present in the starting AlN so as to leave essentially no separate phase selected from the group consisting of $Al_2O_3$, Al-O-N, and mixtures of those phases.

7. A sintered AlN body according to claim 6 wherein said metal is present, as analyzed by weight, in about 0.02–25% and said fluorine is present, as analyzed by weight, in about 0.005–10%.

8. A method for preparing a $Si_3N_4$-based ceramic body of near theoretical density comprising the steps of:
   (a) combining a $Si_3N_4$-based material with about 1–80% by weight of a metal fluoride selected from the group consisting of $AlF_3$, $BaF_3$, $CaF_2$, $SrF_2$, $YF_3$, a fluoride of a lanthanide rare earth metal, and mixtures of those metal fluorides; and
   (b) sintering the combination of $Si_3N_4$-based material and metal fluoride at a temperature between about 1400°–1800° C.

9. A method according to claim 8 wherein said metal fluoride is present in about 5–30% by weight.

10. A method according to claim 8 wherein said sintering temperature ranges about 1400°–1700° C.

* * * * *